J. C. KARR.
ROAD DRAG.
APPLICATION FILED JAN. 6, 1919.

1,347,336.

Patented July 20, 1920.
2 SHEETS—SHEET 1.

John C. Karr
Inventor.

By Milo B. Stevens & Co.
Attorneys.

J. C. KARR.
ROAD DRAG.
APPLICATION FILED JAN. 6, 1919.

1,347,336.

Patented July 20, 1920.
2 SHEETS—SHEET 2.

John C. Karr
Inventor.

By
Attorneys.

UNITED STATES PATENT OFFICE.

JOHN C. KARR, OF CHICAGO, ILLINOIS.

ROAD-DRAG.

1,347,336.

Specification of Letters Patent.  Patented July 20, 1920.

Application filed January 6, 1919. Serial No. 269,867.

*To all whom it may concern:*

Be it known that I, JOHN C. KARR, a citizen of the United States, residing at Chicago, in the county of Cook and State of Illinois, have invented new and useful Improvements in Road-Drags, of which the following is a specification.

This invention relates to implements for scraping the surface of roads to level and grade the same, and its object is to provide an implement of this kind which is very simple in construction and highly efficient in operation, and which is readily adjustable to adapt itself to different conditions of roads.

The object stated is attained by means of a novel combination and arrangement of parts to be hereinafter described and claimed, and in order that the same may be better understood, reference is had to the accompanying drawings forming a part of this specification.

In the drawings:—

Figure 1:
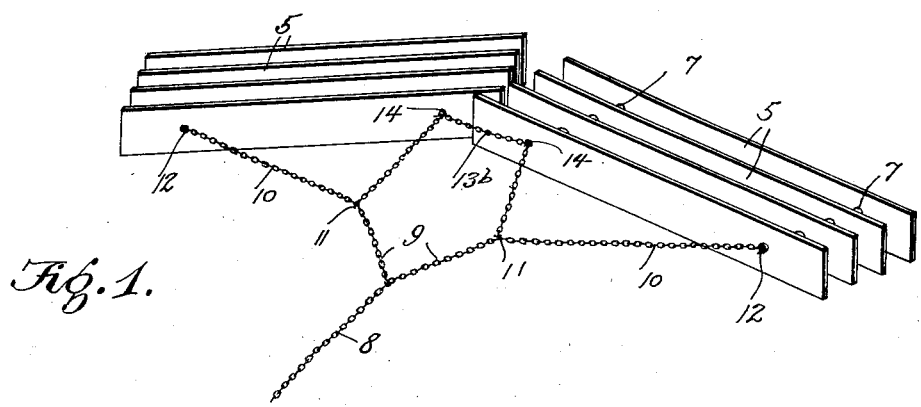
Figure 1 is a perspective view of the implement.
Figure 2:
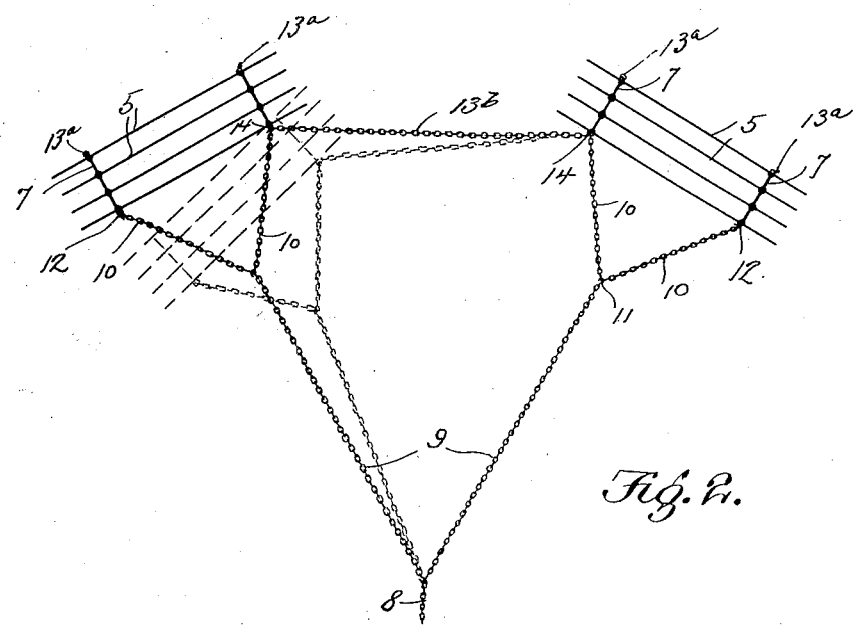
Fig. 2 is a plan view thereof showing an adjustment in dotted lines.
Figure 3:
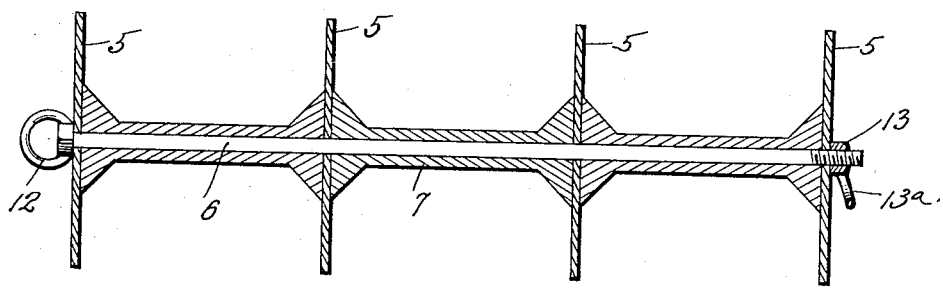
Fig. 3 is an enlarged sectional detail of one of the scraper units.
Figure 4:
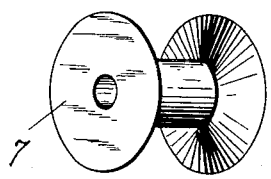
Fig. 4 is a perspective view showing a spacer spool.

Referring specifically to the drawing, the drag is composed of steel plates of suitable length and width connected in parallel and spaced relation, by rods 6 and spacer spools 7, the latter seating between the plates, and the rods passing therethrough. In use two drag units are employed as shown in Figs. 1 and 2.

At 8 is shown a draft chain or line by which the drags are connected to a tractor; or the drags may be operated by a team of horses. The chain 8 has two rearwardly extending and diverging branches 9 which are hitched to two chains 10, which lead to the respective units, the latter being positioned alongside each other with the scraper plates 5 extending transversely of the road at an oblique angle. The branches 9 are fitted with hooks 11 for attachment to the chain 10.

A chain 10 is connected to each drag unit, one end of the chain being connected to said unit near the outer end thereof, and the other end near the inner end of the unit. The attachment is made by eyes 12 on the forward ends of the outer rods 6, and by eyes 14 on the forward ends of the inner rods 6. The rear ends of the rods 6 are threaded to take nuts 13 which hold the plates 5 and the spools 7 assembled on the rods, and which are also formed with eyes $13^a$.

A spacing chain $13^b$ is hooked to the eyes 14 on the forward ends of the inner rods 6. The chain branches 9 are connected to the chains 10 at points between the places where the latter are connected to the drag units, as shown in Figs. 1 and 2. The chain $13^b$ therefore extends between and connects the drag units across, and from each drag unit two lengths of chain extend forward and convergingly to the chain branches 9.

It will be evident from the foregoing that the chain $13^b$ may be adjusted to vary the spread or spacing of the drag units, and the angle of the latter may also be varied as shown dotted in Fig. 2. The two drag units may be set at unequal angles if one side of the road has more rough spots than the other, and the varying angle adapts the implement to a narrow portion of road at one side where the other side is of normal width, so that the scrapings on the narrow side will not be swept aside to the edge of the road, but will be carried to fill holes on the stretch of road being covered.

The multi-bladed drag units have sufficient surface or ground area to keep from dropping into depressions, and the scraping of high spots is assured.

As shown in Figs. 1 and 2, the drag units are set to carry the dirt toward the center of the road, but they can also be set to carry the dirt outward or toward the edges of the road, and they can also be inverted to present new scraping edges. The chains 10 are shown in one length but it may be made in two sections arranged and connected up as shown; also, the chain $13^b$ may be made long, and reduced by returning and hooking a section upon itself when the drag units require gathering at their inner ends. When the forward edges of the drag units have become worn, the chain assembly may be applied to the opposite side of the draw, through the use of the eyes $13^a$ of the units 13, and new working edges thus secured.

I claim:

A road scraper comprising a pair of drag units, a flexible connection between the units for holding the same in laterally spaced relation, a draft chain connected to each unit, one end of said chain being detachably connected to the unit near its outer end and the other end of the chain near the inner end of the unit, a hauling chain having diverging branches connected respectively to the draft chains intermediate the ends of the latter, and means on the rear of the units for connection of the draft chains to permit reversal of the units.

In testimony whereof I affix my signature.

JOHN C. KARR.